United States Patent
Nishino et al.

(10) Patent No.: US 9,735,406 B2
(45) Date of Patent: Aug. 15, 2017

(54) BATTERY PACK

(71) Applicant: PANASONIC CORPORATION, Osaka (JP)

(72) Inventors: Hajime Nishino, Nara (JP); Masato Fujikawa, Osaka (JP); Mikinari Shimada, Osaka (JP); Shunsuke Yasui, Osaka (JP); Shoichiro Watanabe, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 209 days.

(21) Appl. No.: 14/368,716

(22) PCT Filed: Dec. 28, 2012

(86) PCT No.: PCT/JP2012/008458
§ 371 (c)(1),
(2) Date: Jun. 25, 2014

(87) PCT Pub. No.: WO2013/099293
PCT Pub. Date: Jul. 4, 2013

(65) Prior Publication Data
US 2015/0010794 A1 Jan. 8, 2015

(30) Foreign Application Priority Data
Dec. 28, 2011 (JP) ................... 2011-288471

(51) Int. Cl.
*H01M 2/12* (2006.01)
*H01M 2/10* (2006.01)
(Continued)

(52) U.S. Cl.
CPC ......... *H01M 2/1264* (2013.01); *H01M 2/024* (2013.01); *H01M 2/1077* (2013.01);
(Continued)

(58) Field of Classification Search
CPC .... H01M 2/12; H01M 2/1264; H01M 2/1223; H01M 2/1294; H01M 2/1077
See application file for complete search history.

(56) References Cited

U.S. PATENT DOCUMENTS

2008/0090136 A1* 4/2008 Kim .................. B23K 11/0026
429/82
2011/0008667 A1 1/2011 Kwag et al.
(Continued)

FOREIGN PATENT DOCUMENTS

JP 06-215747 A 8/1994
JP 2007-012485 A 1/2007
(Continued)

OTHER PUBLICATIONS

International Search Report issued in PCT/JP2012/008458, dated Apr. 2, 2013, with English translation.

*Primary Examiner* — Milton I Cano
*Assistant Examiner* — Jimmy K Vo
(74) *Attorney, Agent, or Firm* — McDermott Will & Emery LLP (57) ABSTRACT

In a battery pack, a plurality of cells are arranged, the cells each have an outlet through which gas generated in the cell is released in one direction, each two of the cells are arranged as one unit, and the each two of the cells are arranged such that directions of gas released through the outlets of the two cells are opposite to each other.

8 Claims, 8 Drawing Sheets

(51) Int. Cl.
 *H01M 10/0525* (2010.01)
 *H01M 10/48* (2006.01)
 *H01M 2/02* (2006.01)

(52) U.S. Cl.
 CPC ..... *H01M 2/1223* (2013.01); *H01M 10/0525* (2013.01); *H01M 10/488* (2013.01); *H01M 2/12* (2013.01); *H01M 2/1294* (2013.01); *H01M 2220/20* (2013.01)

(56) References Cited

U.S. PATENT DOCUMENTS

| | | | |
|---|---|---|---|
| 2011/0195284 A1* | 8/2011 | Yasui | H01M 2/0242 |
| | | | 429/82 |
| 2011/0274951 A1* | 11/2011 | Yasui | H01M 2/1016 |
| | | | 429/53 |

FOREIGN PATENT DOCUMENTS

| | | | | |
|---|---|---|---|---|
| JP | WO 2010067602 A1 * | 6/2010 | | H01M 2/0242 |
| JP | 2010-244907 A | 10/2010 | | |
| JP | 2011-018640 A | 1/2011 | | |
| JP | 2011-070872 A | 4/2011 | | |
| JP | 2012-199186 A | 10/2012 | | |

* cited by examiner

| | Cell Shape | Outlet | | | | Cell Arrangement | | | Cell Fixing Member |
|---|---|---|---|---|---|---|---|---|---|
| | | Location | Number | Material | Ejection Direction | Orientations of Adjacent Cells | Cell-to-Cell Gap | Stage-to-Stage Gap | |
| First Comparative Example | Cylindrical | Sealing Plate | Three | Metal | Random | Laterally Aligned | 1mm | 5mm | Resin Adhesive |
| Second Comparative Example | Cylindrical | Sealing Plate | Six | Metal | Random | Laterally Aligned | 1mm | 5mm | Resin Adhesive |
| Third Comparative Example | Cylindrical | Sealing Plate | One | Metal | Random | Laterally Aligned | 1mm | 5mm | Resin Adhesive |
| First Example | Cylindrical | Sealing Plate | One | Metal | Opposite | Laterally Aligned | 1mm | 5mm | Resin Adhesive |
| Second Example | Cylindrical | Cap Engraved | One | Metal | Opposite | Laterally Aligned | 1mm | 5mm | Resin Adhesive |
| Third Example | Cylindrical | Sealing Plate | One | Metal | Opposite | Laterally Aligned | 1mm | 5mm | Resin Adhesive |
| Fourth Example | Cylindrical | Sealing Plate | One | Glass Epoxy Resin | Opposite | Laterally Aligned | 1mm | 5mm | Resin Adhesive |
| Fifth Example | Cylindrical | Sealing Plate | One | Metal | Opposite | Oriented in Opposite Directions | 1mm | 5mm | Resin Adhesive |
| Sixth Example | Cylindrical | Sealing Plate | One | Metal | Opposite | Sealing Plates Face Each Other | 1mm | 5mm | Resin Adhesive |
| Seventh Example | Cylindrical | Bottom Plate Engraved | One | Metal | Opposite | Bottom Plates Face Each Other | 1mm | 5mm | Resin Adhesive |
| Eighth Example | Cylindrical | Sealing Plate | One | Metal | Opposite | Laterally Aligned | 1mm | 2 mm & Steel Sheet | Resin Adhesive |
| Ninth Example | Cylindrical | Sealing Plate | One | Metal | Opposite | Laterally Aligned | 1mm | 5mm | Roughened SUS Plate |
| Tenth Example | Cylindrical | Sealing Plate | One | Metal | Opposite | Laterally Aligned | 1mm | 5mm | Three Turns of Metal Foil |
| Eleventh Example | Rectangular | Side Surface Engraved | One | Metal | Opposite | Laterally Aligned | 1mm | 5mm | Resin Adhesive |

| | Cell Shape | Outlet | | | | | Cells To Which Fire Is Spread | | | |
|---|---|---|---|---|---|---|---|---|---|---|
| | | Location | Number | Material | Ejection Direction | Percentage | First Stage | Second Stage | Third Stage | |
| First Comparative Example | Cylindrical | Sealing Plate | Three | Metal | Random | 50% | 6 | 7 | 0 | |
| Second Comparative Example | Cylindrical | Sealing Plate | Six | Metal | Random | 58% | 7 | 8 | 0 | |
| Third Comparative Example | Cylindrical | Sealing Plate | One | Metal | Random | 23% | 2 | 4 | 0 | |
| First Example | Cylindrical | Sealing Plate | One | Metal | Opposite | 4% | 0 | 1 | 0 | |
| Second Example | Cylindrical | Cap Engraved | One | Metal | Opposite | 4% | 0 | 1 | 0 | |
| Third Example | Cylindrical | Sealing Plate | One | Metal | Opposite | 4% | 0 | 1 | 0 | |
| Fourth Example | Cylindrical | Sealing Plate | One | Glass Epoxy Resin | Opposite | 4% | 0 | 1 | 0 | |
| Fifth Example | Cylindrical | Sealing Plate | One | Metal | Opposite | 4% | 0 | 1 | 0 | |
| Sixth Example | Cylindrical | Sealing Plate | One | Metal | Opposite | 4% | 1 | 0 | 0 | |
| Seventh Example | Cylindrical | Bottom Plate Engraved | One | Metal | Opposite | 4% | 1 | 0 | 0 | |
| Eighth Example | Cylindrical | Sealing Plate | One | Metal | Opposite | 4% | 0 | 1 | 0 | |
| Ninth Example | Cylindrical | Sealing Plate | One | Metal | Opposite | 4% | 0 | 1 | 0 | |
| Tenth Example | Cylindrical | Sealing Plate | One | Metal | Opposite | 4% | 0 | 1 | 0 | |
| Eleventh Example | Rectangular | Side Surface Engraved | One | Metal | Opposite | 4% | 0 | 1 | 0 | |

BATTERY PACK

RELATED APPLICATIONS

This application is the U.S. National Phase under 35 U.S.C. §371 of International Application No. PCT/JP2012/008458, filed on Dec. 28, 2012, which in turn claims the benefit of Japanese Application No. 2011-288471, filed on Dec. 28, 2011, the disclosures of which Applications are incorporated by reference herein.

TECHNICAL FIELD

The present disclosure relates to battery packs in each of which a plurality of cells are arranged.

BACKGROUND ART

In recent years, expectations for secondary batteries have been raised from a global environmental perspective. Specifically, attention has been given to secondary batteries as significant techniques for reducing the amount of $CO_2$ emitted, because the secondary batteries are used as power sources of, for example, electric vehicles (EVs), hybrid electric vehicles (HEVs), or electric motorcycles, and are combined with natural energy electric power generation, such as solar-electric power generation or wind power generation. Among the secondary batteries, lithium ion secondary batteries have high energy density, and are expected to be reduced in size and weight. Thus, there are particularly high expectations for lithium ion secondary batteries.

Battery packs in each of which a plurality of cells are connected in parallel or in series are used to power, for example, EVs or to store power generated by solar-electric power generation, and each have a capacity or power suitable for a corresponding one of uses. In this case, the cells are efficiently arranged in a battery pack to enable an increase in volumetric energy density or gravimetric energy density of the battery pack. Thus, a process in which cells are packed is know-how that is significant for fabricators.

PATENT DOCUMENT 1 describes a process in which such cells are arranged.

In order to increase the capacity and volumetric energy density of a battery pack, lithium ion secondary batteries may be used as cells for use in the battery pack. When abnormality occurs in a lithium ion secondary battery, a material inside the cell undergoes thermal runaway, and high-temperature and high-pressure gas is generated in the cell. PATENT DOCUMENT 2 describes a sealing plate including an explosion-proof valve for safely discharging high-temperature and high-pressure gas generated inside a cell to outside the cell to address such an abnormal situation.

Furthermore, when a battery pack includes densely arranged cells, the cells are very close to one another. Thus, when one of the cells undergoes thermal runaway in an abnormal situation, the cells adjacent to the one of the cells may also be forced to start undergoing thermal runaway under the influence of high-temperature and high-pressure gas released through an explosion-proof valve. When such adjacent cells successively undergo thermal runaway, such thermal runaway may adversely affect the safety of the entire battery pack. PATENT DOCUMENT 3 describes a technique in which a duct is provided in a battery pack to safely release high-temperature and high-pressure gas released from a cell under abnormal conditions to outside the battery pack. This can reduce successive thermal runaway reactions in adjacent cells, and can ensure the safety of the battery pack.

CITATION LIST

Patent Documents

PATENT DOCUMENT 1: Japanese Unexamined Patent Publication No. 2011-018640
PATENT DOCUMENT 2: Japanese Unexamined Patent Publication No. H06-215747
PATENT DOCUMENT 3: Japanese Unexamined Patent Publication No. 2011-070872

SUMMARY OF THE INVENTION

Technical Problem

If the safety of an entire battery pack can be ensured even under abnormal cell conditions without impairment of the energy density of the battery pack, the convenience of the battery pack can be improved.

In PATENT DOCUMENT 1, while cells are densely arranged to increase the energy density of a battery pack, it is very difficult to ensure the safety thereof under abnormal cell conditions.

In PATENT DOCUMENT 2, gas generated in a cell under abnormal cell conditions can be safely released to outside the cell, and phenomena such as a rupture of a cell case can be reduced. However, indefinite cells surrounding the cell from which the gas is released through an explosion-proof valve are exposed to the gas, and for this reason, the adjacent cells cannot be prevented from successively undergoing thermal runaway.

To solve the problems, in PATENT DOCUMENT 3, high-temperature and high-pressure gas released from a cell under abnormal cell conditions can be safely released through a duct to outside a battery pack. However, the duct that does not contribute to charge/discharge is placed in the battery pack, and the mass and volume of the battery pack, therefore, increase due to the duct, thereby decreasing the energy density of the battery pack itself.

Various studies, such as the placement of gaps, partitions, or heat insulators in a battery pack, have been conducted to reduce the spread of fire within the entire battery pack even when abnormality occurs in a single cell. However, it has been very difficult to reduce the spread of fire without decreasing the energy density of the battery pack.

The studies showed that fire is spread to other cells in two patterns. In one of the patterns, cells are in direct contact with one another, and for this reason, the heat of one of the cells undergoing thermal runaway directly increases the temperatures of adjacent cells to induce thermal runaway. This thermal runaway has been able to be reduced by spacing the cells about 0.5 mm or more apart from one another.

In the second one of the patterns, fire is spread due to heat transferred through a structure included in a battery pack, such as a stationary plate or a cooling plate used to fix or cool cells. Even in a situation where cells are not in direct contact with one another, when the structure included in the battery pack is made of, for example, a metal having good heat transfer properties, heat is transferred through the structure to adjacent cells, thereby increasing the temperatures of the adjacent cells to induce thermal runaway. This induction of thermal runaway has been able to be reduced by using resin as a material of a fixture for the cells, or by forming an airspace between the cells and the metal plate to minimize the area where the metal plate is in contact with the cells, such as by roughening the surface of the metal plate or by inserting two-ply metal foil between the cells and the metal plate.

However, further studies showed the new third fire spread pattern. Specifically, in this case, high-temperature gas released through a sealing plate of an abnormal cell increases the temperatures of cells adjacent to the abnormal cell to induce thermal runaway.

In the case of an unsealed battery pack in which a small number of cells are arranged, high-temperature gas issuing from a cell is rapidly cooled, and thus, does not affect adjacent cells. However, it was found that in the case of a sealed battery pack which includes small airspaces and in which a large number of cells are arranged, gas issuing from a cell in the battery pack is kept at high temperature, and significantly affects adjacent cells.

Furthermore, a gas outlet of a cell often serves as an electrode terminal (sealing plate) thereof, and leads are, therefore, provided in the vicinity of the gas outlet to provide electrical connection between the cells. For this reason, when a protection wall is provided to block high-temperature gas, the structure of the protection wall is complicated. Thus, the energy density of the battery pack decreases, and the cost thereof increases.

It is an object of the present disclosure to provide a battery pack that can ensure safety under abnormal conditions without impairment of the energy density.

Solution to the Problem

In a battery pack according to the present disclosure, a plurality of cells are arranged, the cells each have an outlet through which gas generated in the cell is released in one direction, each two of the cells are arranged as one unit, and the each two of the cells are arranged such that directions of gas released through the outlets of the each two of the cells are opposite to each other.

In another battery pack according to the present disclosure, a plurality of cells are arranged, the cells each have an outlet through which gas generated in the cell is released in one direction, each three of the cells are arranged as one unit, the each three of the cells include a first cell, a second cell, and a third cell, and the each three of the cells are arranged such that a direction of gas released through the outlet of the first cell is toward the second cell, a direction of gas released through the outlet of the second cell is toward the third cell, and a direction of gas released through the outlet of the third cell is toward the first cell.

In a preferred embodiment, a mark indicating a direction of gas released through the outlet may be placed on a case for each cell.

In a preferred embodiment, the cells may each include a cylindrical case having an opening, and a sealing plate configured to seal the opening and having a central portion including a protrusion, and the single outlet may be formed in a sidewall of the protrusion.

Advantages of the Invention

The present disclosure enables the provision of a battery pack that can ensure safety under abnormal conditions without impairment of the energy density.

BRIEF DESCRIPTION OF THE DRAWINGS

FIG. 3 is a table illustrating the shape of each of cells for use in the battery assembly, the configuration of an outlet or outlets, and the arrangement of the cells.

DESCRIPTION OF EMBODIMENTS

Embodiments of the present disclosure will be described in detail hereinafter with reference to the drawings. The present disclosure is not limited to the following embodiments. Various changes and modifications may be made without departing from the scope of the invention.

The present inventors analyzed battery packs and cells after a fire spread test while observing the positional relationship between an unburned one of the cells and some thereof adjacent to the unburned cell in detail, and consequently found that the direction of fire propagation has a certain tendency. Specifically, the present inventors found that while one of the adjacent cells in the direction of release of gas from an abnormal cell is more likely to be burned, the other ones thereof deviating from the direction of release of the gas are less likely to be burned.

This shows that the orientation of an outlet through which gas is released significantly affects the spread of fire to other cells. Thus, in order to ensure the safety of a battery pack, it is important to control the directions of release of gas from cells.

Typically, several gas outlets of a cylindrical cell are formed in a protrusion (electrode terminal) formed on a sealing plate configured to seal an opening of a cell case, and are located in the protrusion symmetrically about a point to prevent the cell itself from flying due to the reaction of the gas released through the outlets. This enables the uniform dispersion of the gas released through the outlets, thereby preventing the cell from flying.

In a battery pack of the present disclosure, a plurality of cells are arranged, each cell has an outlet through which gas generated in the cell is released in one direction, and each two of the cells are arranged as one unit. The directions of release of gas through the outlets of the each two of the cells (each pair of cells) are opposite to each other.

With such a configuration, when abnormality occurs in one of the each two of the cells, high-temperature gas released from the abnormal cell is ejected only to the other cell facing the abnormal cell, and the area where fire is spread can be limited. Even when fire is spread to the other cell to which the high-temperature gas is ejected, and the other cell undergoes thermal runaway to cause release of high-temperature gas therefrom, the high-temperature gas is ejected only to the one of the each two of the cells that has already undergone thermal runaway. For this reason, cells except the pair of cells are not exposed to the high-temperature gas, and therefore, fire is not spread to the cells.

Each three of the cells forming the battery pack may be arranged as one unit. In this case, the each three of the cells are arranged such that gas released from each cell is directed toward one of the other two cells. Specifically, when the each three of the cells include a first cell, a second cell, and a third cell, the each three of the cells are arranged such that gas released through an outlet of the first cell is directed toward the second cell, gas released through an outlet of the second cell is directed toward the third cell, and gas released through an outlet of the third cell is directed toward the first cell.

With such a configuration, when abnormality occurs in the first cell out of the three cells, high-temperature gas released from the abnormal cell is ejected only to the second cell, and the area where fire is spread can be limited. Even when fire is spread to the second cell to which the high-temperature gas is ejected, and the second cell undergoes thermal runaway to cause release of high-temperature gas therefrom, the high-temperature gas is ejected only to the third cell. This causes the spread of fire to the third cell, leading to thermal runaway. Meanwhile, high-temperature gas released from the third cell is ejected only to the first cell that has already undergone thermal runaway. For this reason, cells except the three cell are not exposed to the high-temperature gas, and therefore, fire is not spread to the cells.

Alternatively, each four of the cells forming the battery pack may be arranged as one unit. In this case, the each four of the cells are arranged such that gas released from each cell is directed toward one of the other three cells. Specifically, when the each four of the cells include a first cell, a second cell, a third cell, and a fourth cell, the each four of the cells are arranged such that gas released through an outlet of the first cell is directed toward the second cell, gas released through an outlet of the second cell is directed toward the third cell, gas released through an outlet of the third cell is directed toward the fourth cell, and gas released through an outlet of the fourth cell is directed toward the first cell.

With such a configuration, when abnormality occurs in the first cell out of the four cells, high-temperature gas released from the abnormal cell is ejected only to the second cell, and the area where fire is spread can be limited. Even when fire is spread to the second cell to which the high-temperature gas is ejected, and the second cell undergoes thermal runaway to cause release of high-temperature gas therefrom, the high-temperature gas is ejected only to the third cell, and even when fire is spread to the third cell to which the high-temperature gas is ejected, and the third cell undergoes thermal runaway to cause release of high-temperature gas therefrom, the high-temperature gas is ejected only to the fourth cell. This causes the spread of fire to the fourth cell, leading to thermal runaway. Meanwhile, high-temperature gas released from the fourth cell is ejected only to the first cell that has already undergone thermal runaway. For this reason, cells except the four cells are not exposed to the high-temperature gas, and therefore, fire is not spread to the cells.

When, as such, each two through four, from each of which the direction of release of gas is regulated in one direction, of the cells forming the battery pack are arranged as one unit, fire can be spread only to two through four cells forming each of the units of arrangement even in a situation where abnormality occurs in one of the cells, and fire can be prevented from being spread over the entire battery pack. This enables the fabrication of a battery pack that can ensure safety under abnormal conditions without impairment of the energy density.

In the present disclosure, a mark indicating a direction of gas released through the outlet is preferably placed on a case for each cell. Thus, when the cells are arranged to form a battery pack, two through four cells forming each of the units of arrangement are easily arranged such that gas released from each cell is directed in a predetermined direction with reference to the mark placed on the case for each cell.

In the present disclosure, the cells each preferably include a cylindrical case having an opening, and a sealing plate configured to seal the opening and having a central portion including a protrusion, and the single outlet is preferably formed in a sidewall of the protrusion. The protrusion may serve as an electrode terminal of the cell. Thus, the cells from each of which the direction of release of gas is regulated in one direction can have a simple configuration. This enables easy fabrication of a battery pack that can ensure safety under abnormal conditions without impairment of the energy density.

In the present disclosure, the configuration of the outlet through which gas is released is not specifically limited. For example, the opening of the cell case may be sealed by the sealing plate including an explosion-proof valve and having a hole, and when the internal pressure of the cell increases, and the explosion-proof valve, therefore, operates, gas may be released through the hole (outlet) formed in the sealing plate. Alternatively, the sidewall or bottom of the cell case may have a thin portion, and gas may be released through an opening (outlet) formed by a rupture of the thin portion due to an increase in internal pressure of the cell.

In the present disclosure, the configuration of the mark indicating the direction of release of gas through the outlet is not specifically limited. For example, a pattern, a protrusion, an indentation, or a sticker may be placed on the case, or the mark may be engraved or printed on the case.

If the pattern is placed as the mark, the use of solvent-resistant ink or patterning after the injection of an electrolyte into each cell or after a cleaning process preferably prevents the pattern from being lost due to the deposition of the organic electrolyte on the mark in a cell assembly process. Alternatively, if the protrusion is formed as the mark, the protrusion is preferably placed on the cell case with an adhesive in the last step for cell assembly. If the indentation is formed as the mark, the formation of the indentation in a final process step may cause damage to an electrode group in the case. Thus, the indentation is preferably formed before the placement of components on an assembly line, and the outlets are preferably aligned with the indentation marks during assembly. If the mark is engraved, the mark can be formed on the case surface by laser printing. In this case, the mark has resistance to solvent, and hardly causes damage to the interior of the case. Thus, the mark can be engraved in either of stages of the assembly process. If the sticker is pasted as the mark before the assembly process or in early stages of the assembly process, a material and an adhesive that do not fall off due to the friction of a tool against the sticker or contact between an electrolyte and the sticker need to be used. If the sticker is pasted, it can be removed after the cells are fixed to the battery pack.

In the present disclosure, the type of each cell is not specifically limited. The present disclosure can be applied to, for example, nonaqueous electrolyte secondary batteries, such as cylindrical, flat, coin-shaped, and rectangular batteries, and the cell shape is not specifically limited. Typical examples of the nonaqueous electrolyte secondary batteries can include lithium ion secondary batteries.

EXAMPLES

The present disclosure will be specifically described with reference to examples and comparative examples. Note that the present disclosure is not limited to the following examples.

Figure 1:
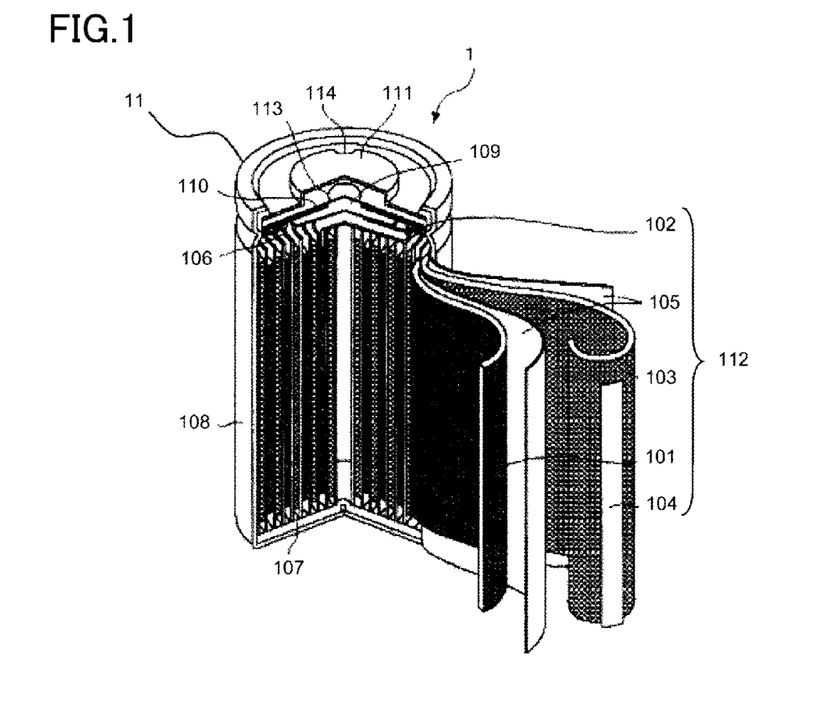
FIG. 1 is a schematic view illustrating the configuration of a lithium ion secondary battery of the present disclosure.

FIG. 1 is a schematic view illustrating the configuration of a lithium ion secondary battery (hereinafter simply referred to as "cell") fabricated in this example.

As illustrated in FIG. 1, a plate pack 112 includes a positive electrode plate 101 and a negative electrode plate 103 that are wound with a separator 105 interposed therebetween, and is housed in a battery case 108 together with an electrolyte. An opening of the battery case 108 is sealed by a sealing plate 110, a protrusion 111 is formed on a central portion of the sealing plate 110, and a single outlet 114 is formed in the sidewall of the protrusion 111. Gas generated in the battery is regulated in one direction, and is released through the outlet 114 to outside the battery.

The cell 1 illustrated in FIG. 1 was fabricated in the following manner.

A current collector made of aluminum foil and coated with a positive electrode mixture was used as the positive electrode plate 101, and a current collector made of copper foil and coated with a negative electrode mixture was used as the negative electrode plate 103. The thickness of the separator 105 was 20 µm. A positive electrode lead current collector 102 and the aluminum foil current collector were laser welded to each other. Furthermore, a negative electrode lead current collector 104 and the copper foil current collector were welded to each other by resistance welding. The negative electrode lead current collector 104 was electrically connected to the bottom of a closed-end metal case 108 by resistance welding. The positive electrode lead current collector 102 was electrically connected to a metal filter of the sealing plate 110 including an explosion-proof valve by laser welding. A nonaqueous electrolyte was injected through an opening of the closed-end metal case 108 into the closed-end metal case 108. A groove was formed in an open end of the closed-end metal case 108, the positive electrode lead current collector 102 was bent, an outer resin gasket 109 and the sealing plate 110 were inserted into the groove of the closed-end metal case 108, and the open end of the closed-end metal case 108 was crimped to seal the closed-end metal case 108.

(1) Fabrication of Negative Electrode Plate

Carboxymethylcellulose (CMC) was dissolved in water to obtain an aqueous solution having a CMC concentration of 1% by mass. One hundred parts by mass of graphite particles (having an average particle size of 20 µm and a specific surface area of 4.2 m$^2$/g) and 100 parts by mass of the CMC aqueous solution were mixed together, and the resultant mixture was stirred while the temperature of the mixture was controlled to 25° C. Thereafter, the mixture was dried at 120° C. for five hours to obtain a dried mixture.

One hundred and one parts by mass of the dried mixture, 0.6 parts by mass of a binder of styrene butadiene rubber (SBR), 0.9 parts by mass of carboxymethylcellulose, and an appropriate amount of water were mixed together to prepare a negative electrode mixture slurry. The negative electrode mixture slurry was applied to both surfaces of electrolytic copper foil (thickness: 12 µm) by die coating, and the resultant object was dried at 120° C. and then rolled with a roller to form a 160-µm-thick negative electrode mixture layer. The negative electrode mixture layer and the electrolytic copper foil were cut into a predetermined shape to obtain the negative electrode plate 103.

(2) Fabrication of Positive Electrode Plate

Four parts by mass of polyvinylidene fluoride (PVDF) serving as a binder were added into 100 parts by mass of $LiNi_{0.80}Co_{0.15}Al_{0.05}O_2$ serving as a positive electrode active material, and the resultant mixture was mixed with an appropriate amount of N-methyl-2-pyrrolidone (NMP) to prepare a positive electrode mixture slurry. The positive electrode mixture slurry was applied to both surfaces of 20-µm-thick aluminum foil by die coating, and the resultant object was dried and then rolled to form a positive electrode mixture layer. The positive electrode mixture layer and the aluminum foil were cut into a predetermined shape to obtain the positive electrode plate 101.

(3) Preparation of Nonaqueous Electrolyte $LiPF_6$ was dissolved in a mixed solvent containing ethylene carbonate (EC), ethyl methyl carbonate (EMC), and dimethyl carbonate (DMC) in a mass ratio $V_{EC}:V_{EMC}:V_{DMC}$ of 20:20:60 at a concentration of one mole/liter to prepare the nonaqueous electrolyte.

(4) Fabrication of Cell

The positive electrode plate 101 and the negative electrode plate 103 were wound with the 20-µm-thick separator 105 interposed therebetween to fabricate the cylindrical plate pack 112. The plate pack 112 is inserted into the closed-end metal case 108, and the opening of the closed-end metal case 108 was sealed to fabricate the cell 1. The cell 1 was a cylindrical cell having a diameter of 18 mm and a height of 65 mm, and the design capacity of the cell was 2750 mAh. The fabricated cell 1 was covered with a 80-µm-thick heat-shrinkable tubing 11 made of polyethylene terephthalate, and the resultant object was thermally shrunk with hot air having a temperature of 90° C. to form a completed cell.

<Fire Spread Test>

(1) Cell Charging

The fabricated cell was charged at a constant current of 1.375 A (0.5 It) from its discharged state until its voltage reached 4.2 V, and was then charged at a constant voltage of 4.2 V. The charging was finished when the current reached 0.05 A.

(2) Fabrication of Battery Assembly for Fire Spread Examination

Figure 2:
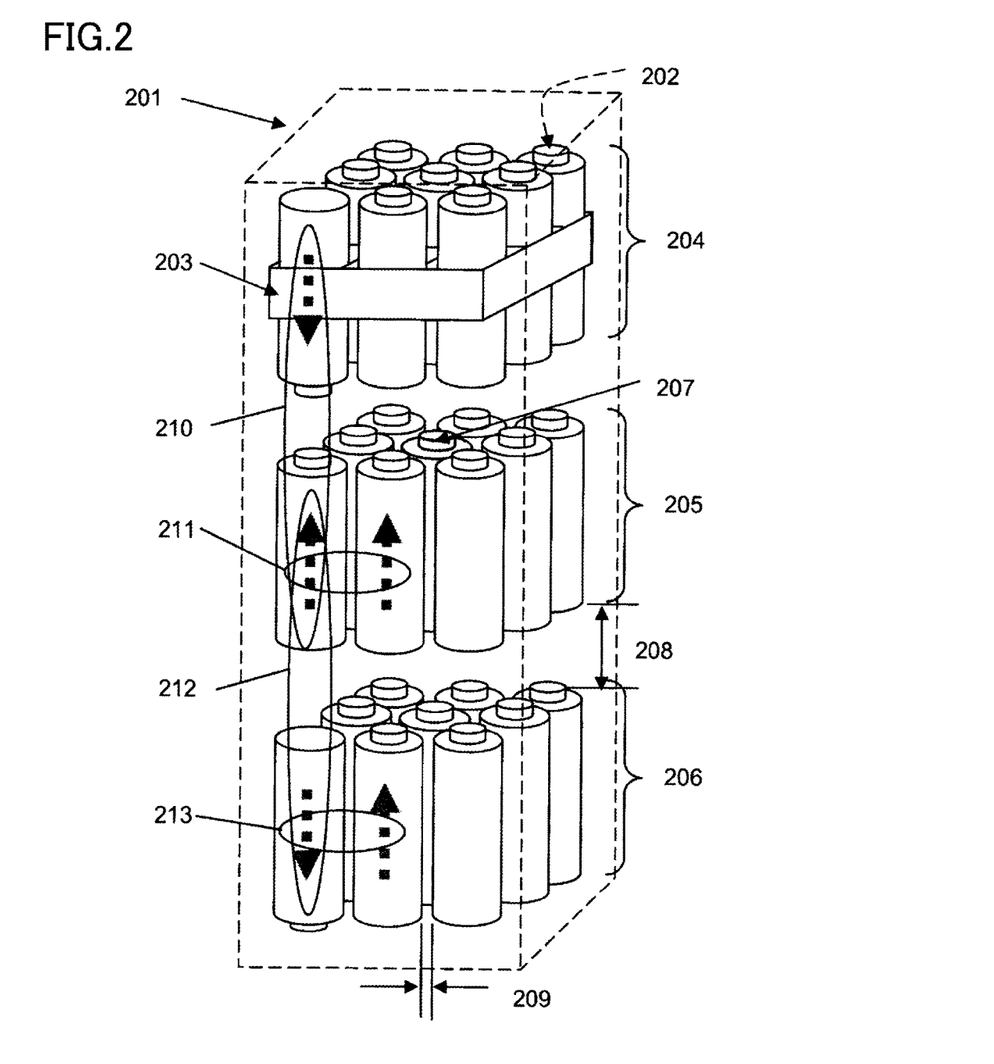
FIG. 2 is a perspective view illustrating the configuration of a battery assembly used in a fire spread test.

Such a battery assembly for fire spread examination as illustrated in FIG. 2 was fabricated using fabricated cells. To fix the cells, an adhesive or a metal plate was used as a fixing member 203 to surround central portions of the cells. The battery assembly included a first-stage module 204, a second-stage module 205, and a third-stage module 206 that each include nine cells and are combined together. A trigger cell 207 was located at the center of the second-stage module 205 so as to be initially overheated during a fire spread test.

FIG. 3 is a table illustrating the shape of each of the cells for use in the battery assembly, the configuration of an outlet or outlets, and the arrangement of the cells.

Cylindrical and rectangular cells were used. The outlet or outlets were formed in the sealing plate, or a bottom plate or a side surface of each cell. The outlet formed in the bottom plate or the side surface of the cell was formed by engraving a cell case (by forming a thin part of the cell case).

Figure 4:
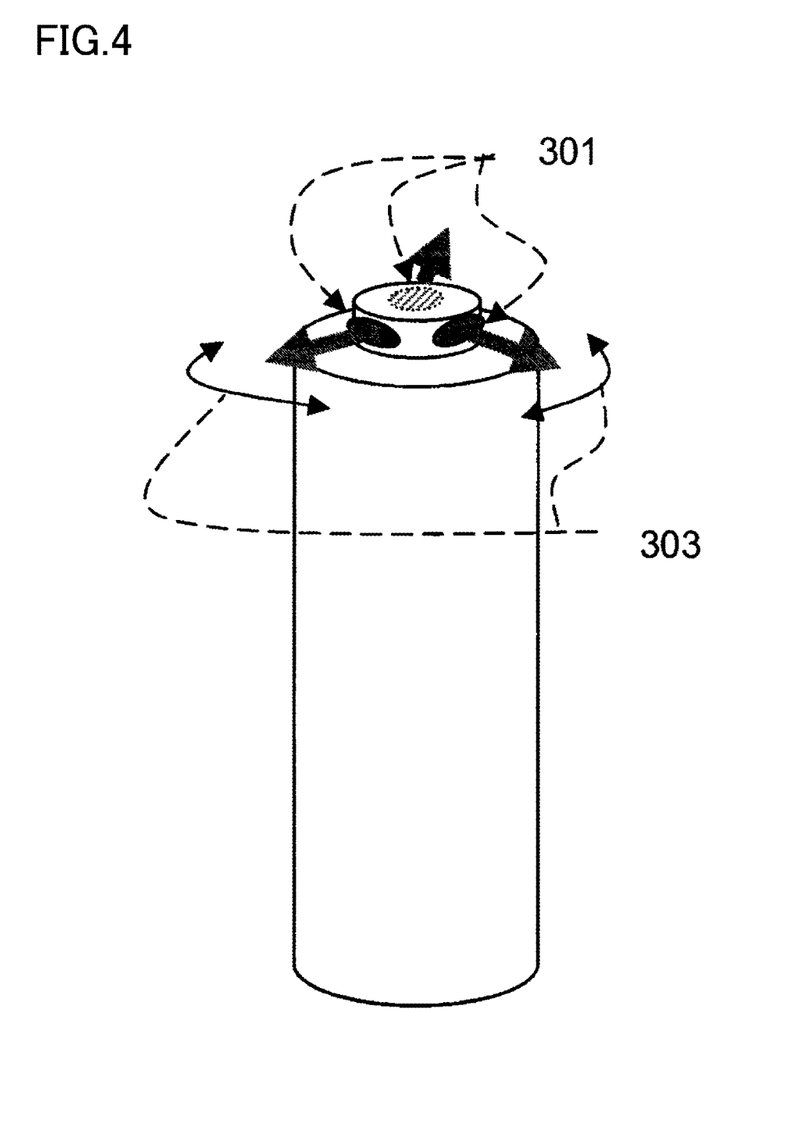
FIG. 4 is a diagram illustrating an example in which a sealing plate of a cylindrical cell has outlets.

FIG. 4 is a diagram illustrating an example in which outlets 301 are formed in a sealing plate of a cylindrical cell.

The outlets 301 are openings formed in the sidewall of a protrusion (cap) of the sealing plate, and the number of the outlets 301 is one, three, or six. The reference character 303 in FIG. 4 denotes a direction of ejection of gas.

The cells were arranged such that the module stage-to-stage gap 208 and the cell-to-cell gap 209 were adjusted as illustrated in FIG. 2, thereby fabricating a battery assembly. The fabricated battery assembly is wholly covered with a battery pack case 201 made of polycarbonate resin to form a battery pack.

As illustrated in FIG. 2, patterns of an adjacent pair of cells included a pattern 210 in which a sealing plate of one of the adjacent pair of cells in a module faces a sealing plate of the other cell in an adjacent module, a pattern 211 in which the adjacent pair of cells in a module are arranged in a lateral direction, a pattern 212 in which a bottom plate of one of the adjacent pair of cells in a module faces a bottom plate of the other cell in an adjacent module, and a pattern 213 in which the adjacent pair of cells in a module are oriented in opposite directions.

Figure 5A:
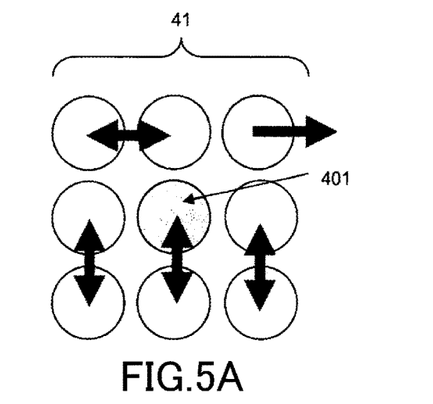
FIGS. 5A and 5B are diagrams each illustrating a pattern in which the directions of release of gas from two cells are opposite to each other.
Figure 5B:
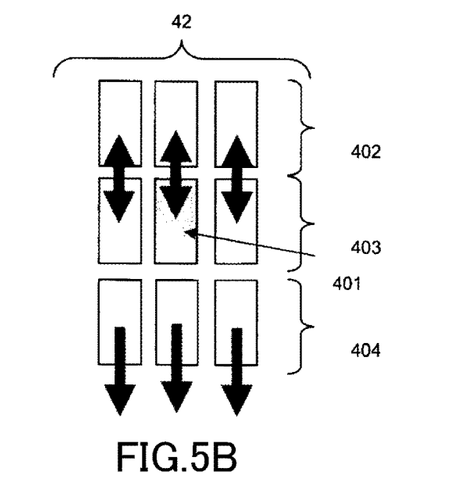

Patterns in which when the outlet number is one, the directions of release of gas from two cells are opposite to each other included a pattern 41 in which as illustrated in FIG. 5A, each two of cells are arranged, as one unit, in a module such that the directions of release of gas from the each two of the cells are opposite to each other, and a pattern 42 in which as illustrated in FIG. 5B, the direction of release of gas from one of the each two of the cells in a module is opposite to the direction of release of gas from the other cell in an adjacent module. When a pair of cells is located astride the border between an adjacent pair of stages, the direction of release of gas from one of the cells in a first-stage module 402 is adjusted toward a corresponding trigger cell 401 in a second-stage module 403, and gas is released outward of the battery pack from cells in a third-stage module 404.

Figure 6A:
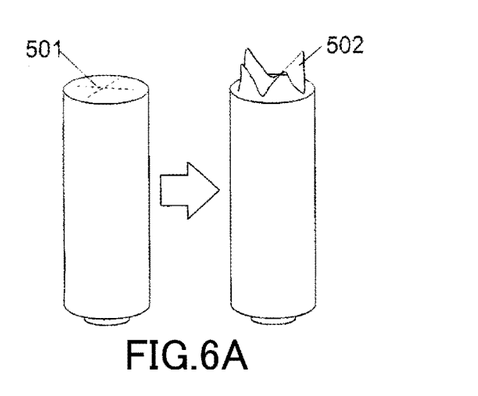
FIGS. 6A and 6B are diagrams each illustrating the configuration of a cylindrical cell in which an outlet is formed by engraving.
Figure 6B:
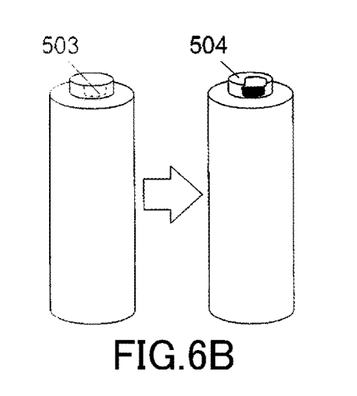
Figure 7:
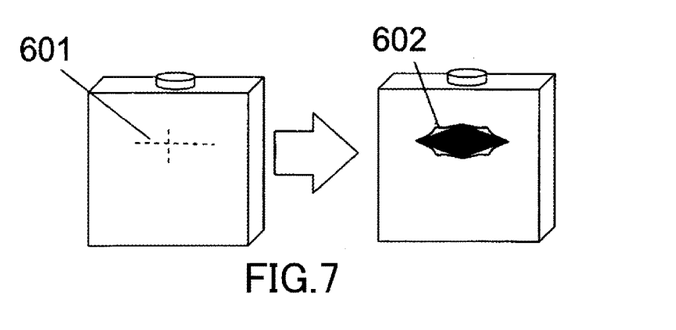
FIG. 7 is a diagram illustrating the configuration of a rectangular cell in which an outlet is formed by engraving.

FIGS. 6A and 6B are diagrams each illustrating the configuration of a cylindrical cell including an outlet formed by engraving. In FIG. 6A, a bottom plate 501 of the cylindrical case is engraved, and the internal pressure of the cell increases to rupture the engraved portion of the bottom plate 501, thereby forming an outlet 502. In FIG. 6B, a sidewall 503 of a protrusion (cap) of a sealing plate is engraved, and the internal pressure of the cell increases to rupture the engraved portion of the sidewall 503, thereby forming an outlet 504. In FIG. 7, a side surface 601 of a rectangular case is engraved, and the internal pressure of the cell increases to rupture the engraved portion of the side surface 601, thereby forming an outlet 602.

(3) Fire Spread Test

In the battery assembly illustrated in FIG. 2, the trigger cell 207 located at the center of the battery assembly was electrically insulated from the other cells, and the trigger cell 207 was overcharged by being charged at a constant current of 10 A and at a constant voltage of 50 V, and was overheated.

Figure 8:
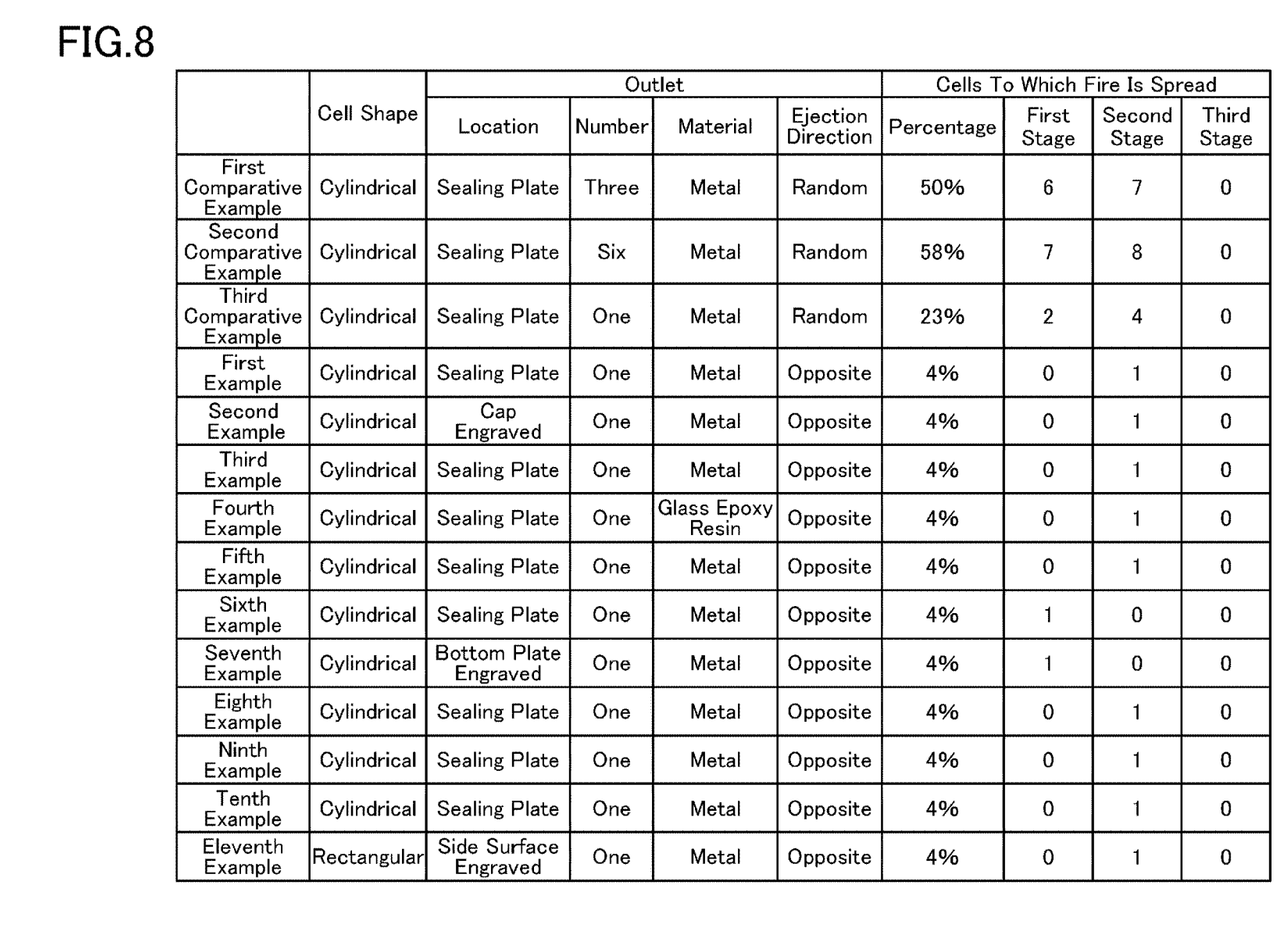
FIG. 8 is a table providing a summary of the results of the fire spread test.

FIG. 8 is a table illustrating the result obtained by conducting a fire spread test on each of the battery assemblies illustrated in the table in FIG. 3. In the fire spread test, examinations were conducted by counting the number of cells to which fire is spread. When the number of cells to which fire is spread from the trigger cell 207 is one, it was determined that fire was not spread.

In a first comparative example illustrated in FIG. 8, outlets were oriented in three directions, and in a second comparative example illustrated therein, outlets were oriented in six directions. This causes high-temperature gas released through outlets of a trigger cell to be radially ejected, and fire was, therefore, spread to seven cells in the first comparative example out of cells in a second-stage module including the trigger cell, and eight cells out of the cells therein in the second comparative example. Fire was spread also to cells in a first-stage module. The reason for this may be that since most of the cells in the second-stage module were overheated, fire was spread to the cells in the first-stage module due to heat radiated from the cells in the second-stage module.

In a third comparative example, while an outlet was oriented in one direction, cells were randomly arranged without regulating the directions of ejection of gas through the outlets, and fire was, therefore, spread to four cells out of the cells in a second-stage module including a trigger cell 207. The reason for this may be that fire was spread to the cells adjacent to the trigger cell 207 due to high-temperature gas ejected from the trigger cell 207, and fire was furthermore spread from the adjacent cells to other cells. Fire was spread also to the cells in a first-stage module. The reason for this may be that fire was spread to the cells in the first-stage module due to heat radiated from the cells in the second-stage module.

In contrast, in each of first through fifth examples, an outlet of each of cells was oriented in one direction, and the directions of release of gas from two of the cells were opposite to each other. Thus, fire was spread only to one of the cells facing a trigger cell 207. The reason for this may be that high-temperature gas released from the trigger cell 207 was ejected only to the one of the cells facing the trigger cell 207, and the area where fire was spread was able to be limited. Even if one of the cells to which fire was spread further releases high-temperature gas, the high-temperature gas is ejected only to the trigger cell 207 that has already undergone thermal runaway; therefore, fire is not spread to other cells except the two cells.

In each of sixth and seventh examples, an outlet of each of cells was oriented in one direction, and one of a sealing plate and a bottom plate of a cell in a module faced a corresponding one of a sealing plate and a bottom plate of a cell, which faces the cell in the module, in an adjacent module. Thus, fire was spread only to one of the cells of the first-stage module facing a trigger cell 207. The reason for this may be that similarly to the first through fifth examples, high-temperature gas released from the trigger cell 207 was ejected only to the one of the cells facing the trigger cell 207, and the area where fire was spread was able to be limited.

In an eleventh example, rectangular cells were used, an outlet of each cell was formed in a side surface of a cell case by engraving, and the directions of release of gas from two of the cells were opposite to each other. Also in this case, similarly to the first through fifth examples, fire was spread only to one of the cells facing a trigger cell 207.

Incidentally, even if cells in a battery assembly are not exposed directly to high-temperature gas from an overheated cell, they may be overheated due to heat transferred from the overheated cell through a fixing member for the cells or heat radiated from the overheated cell. Here, in order to realize the advantages of the present disclosure, additional studies were conducted on the influence of the transferred heat and the radiated heat.

In an eighth example, the distance between each adjacent pair of modules was reduced from 5 mm in the first through seventh examples to 2 mm. In this case, cells in first- and third-stage modules may be overheated under the influence of heat radiated from an overheated cell in a second-stage module. However, in the eighth example, a steel sheet was inserted between each adjacent pair of the modules to enable a reduction in the influence. The reason for this is that the steel sheet inserted between each adjacent pair of the modules blocked the radiated heat.

In each of ninth and tenth examples, the material of a fixing member for cells was changed from a resin adhesive in the first through seventh examples to a metal plate (SUS plate). In this case, cells in first- and third-stage modules may be overheated due to heat transferred from an overheated cell in a second-stage module through the fixing member. However, in the ninth example, a surface of the metal plate being in contact with the cells was roughened to enable a reduction in the influence of the transferred heat. The reason for this is that the roughening of the metal plate surface reduced the area where the metal plate is in contact with the cells, and reduced the amount of the transferred heat. In the tenth example, three turns of metal foil were wound around the cells to enable a reduction in the influence of the transferred heat. The reason for this is that three turns of metal foil were wound around the cells to form an airspace between the metal plate forming the fixing member and the cells, and the amount of the transferred heat was, therefore, reduced.

The above examination results show that when two cells (a pair of cells) are arranged such that the directions of gas released through the outlets of the cells are opposite to each other, and abnormality occurs in one of the cells, high-temperature gas released from the abnormal cell is ejected only to the other cell facing the abnormal cell, and the area where fire was spread can be limited. In this case, even if fire is spread to the other cell to which the high-temperature gas is ejected, and the other cell undergoes thermal runaway and releases high-temperature gas, the high-temperature gas is ejected only to the one of the cells that has already undergone thermal runaway. This can prevent fire from being spread to other cells except the pair of cells.

Next, example marks placed on cells and a battery pack will be described with reference to FIGS. 9 and 10.

Figure 9:
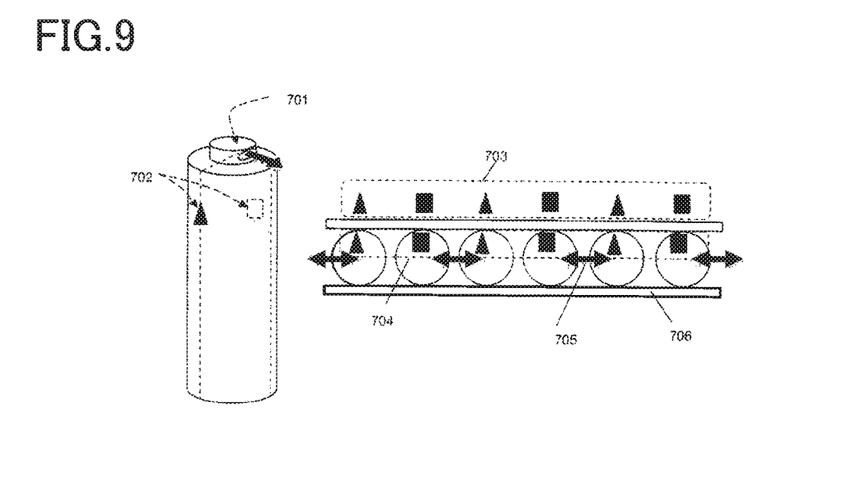
FIG. 9 is a diagram for explaining example marks placed on cells.

FIG. 9 illustrates an example in which two types of marks 702 are used to alternately change the orientations of outlets 701 of cells. A mark 704 on each cell is aligned with a corresponding one of marks 703 on a battery pack to form a pair of cells, and the gas release directions 705 are opposite to each other.

Figure 10:
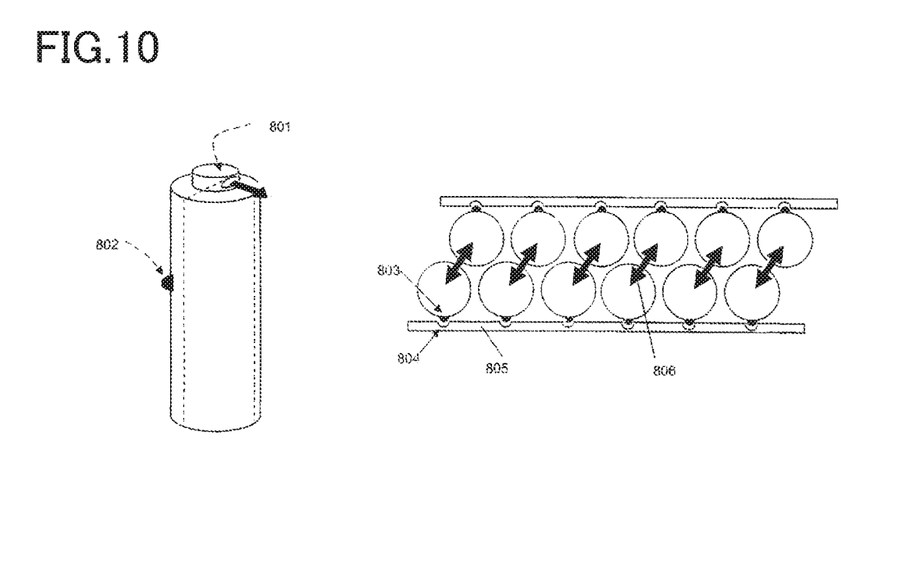
FIG. 10 is a diagram for explaining example marks placed on cells.

FIG. 10 illustrates an example in which protrusions and indentations are combined together to control the directions of release of gas. A protrusion-shaped mark 802 of polypropylene resin is formed on each of cell cases with an adhesive at 120° from an outlet 801. The mark 802 is fitted into a corresponding one of indentations 804 formed in a fixing member 805 for cells to allow the gas release directions 806 to be opposite to each other.

The present disclosure has been described by way of the preferred embodiment. However, such description of the embodiment should not be construed as limiting, and thus, various modifications can be made thereto. While, for example, in the examples, each two of a plurality of cells forming a battery pack are arranged as one unit, each three or four of the cells may be arranged as one unit.

Figure 11:
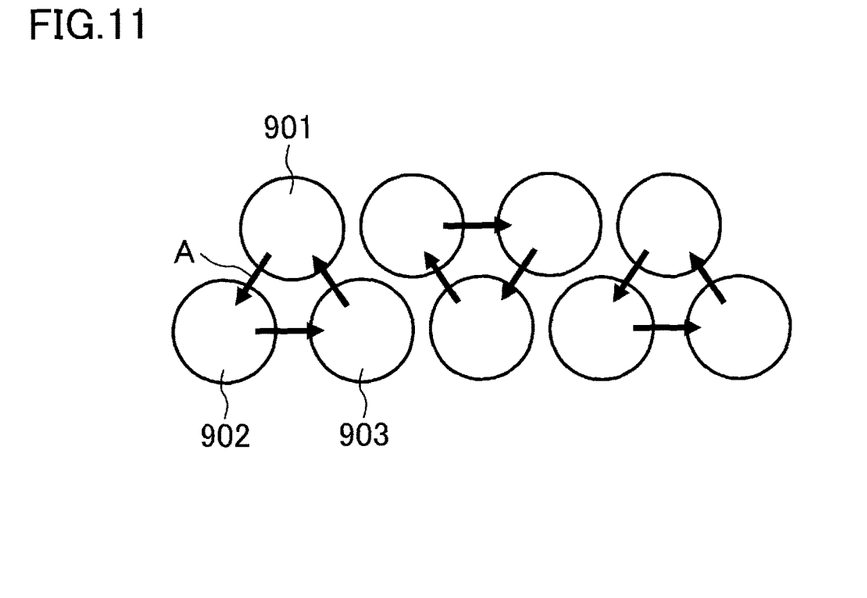
FIG. 11 is a diagram illustrating an example battery pack in which each three of cells are arranged as one unit.

FIG. 11 is a diagram illustrating an example in which each three of cells are arranged as one unit. As illustrated in FIG. 11, three cells are arranged such that the direction A of gas released through an outlet of a first cell 901 is toward a second cell 902, the direction A of gas released through an outlet of the second cell 902 is toward a third cell 903, and the direction A of gas released through an outlet of the third cell 903 is toward the first cell 901.

With this configuration, even when abnormality occurs in the first cell 901 out of the three cells, high-temperature gas released from the abnormal cell is ejected only to the second cell 902, and the area to which damage is caused can be limited. Even if fire is spread to the second cell 902 to which the high-temperature gas is ejected, and the second cell 902 undergoes thermal runaway and releases high-temperature gas, the high-temperature gas is ejected only to the third cell 903. This causes fire to be spread also to the third cell 903, and the third cell 903 also undergoes thermal runaway, whereas high-temperature gas released from the third cell 903 is ejected only to the first cell 901 that has already undergone thermal runaway. For this reason, other cells except the three cells are not exposed to the high-temperature gas, and fire is not spread to the other cells.

Figure 12:
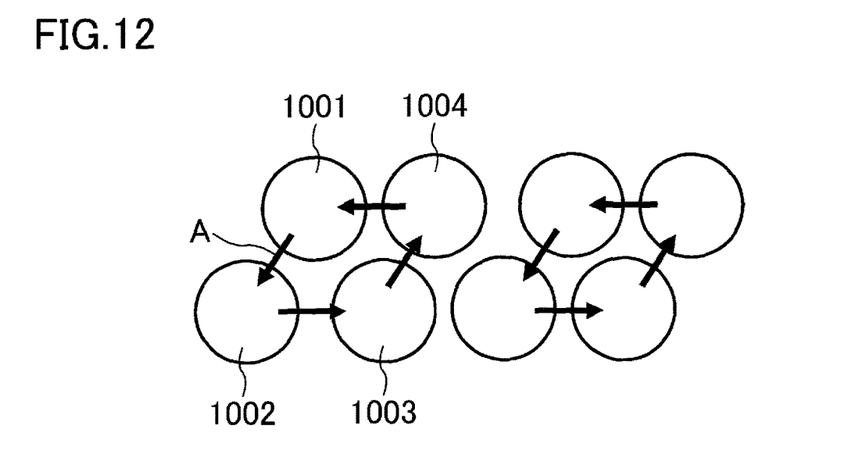
FIG. 12 is a diagram illustrating an example battery pack in which each four of cells are arranged as one unit.

FIG. 12 is a diagram illustrating an example in which each four of cells are arranged as one unit. As illustrated in FIG. 12, four cells are arranged such that the direction A of gas released through an outlet of a first cell 1001 is toward a second cell 1002, the direction A of gas released through an outlet of the second cell 1002 is toward a third cell 1003, the direction A of gas released through an outlet of the third cell 1003 is toward a fourth cell 1004, and the direction A of gas released through an outlet of the fourth cell 1004 is toward the first cell 1001.

With this configuration, even when abnormality occurs in the first cell 1001 out of the four cells, high-temperature gas released from the abnormal cell is ejected only to the second cell 1002, and the area to which damage is caused can be limited. Even if fire is spread to the second cell 1002 to which the high-temperature gas is ejected, and the second cell 1002 undergoes thermal runaway and releases high-temperature gas, the high-temperature gas is ejected only to the third cell 1003. This causes fire to be spread also to the third cell 1003, and the third cell 1003 also undergoes thermal runaway, whereas high-temperature gas released from the third cell 1003 is ejected only to the fourth cell 1004. This causes fire to be spread also to the fourth cell 1004, and the fourth cell 1004 also undergoes thermal runaway, whereas high-temperature gas released from the fourth cell 1004 is ejected only to the first cell 1001 that has already undergone thermal runaway. For this reason, other cells except the four cells are not exposed to high-temperature gas, and fire is not spread to the other cells.

INDUSTRIAL APPLICABILITY

A battery pack of the present disclosure is useful for large power sources for, for example, solar-electric power generation or wind power generation, power sources for vehicles, such as electric vehicles or hybrid electric vehicles (HEVs), and other power sources.

DESCRIPTION OF REFERENCE CHARACTERS

11 Cell Can Insulator
101 Positive Electrode Plate
102 Positive Electrode Lead Current Collector
103 Negative Electrode Plate
104 Negative Electrode Lead Current Collector
105 Separator
108 Closed-End Metal Case
109 Outer Resin Gasket
110 Sealing Plate
112 Plate Pack
114 Outlet
201 Battery Pack Case 204 First-Stage Module
205 Second-Stage Module
206 Third-Stage Module
207 Trigger Cell
208 Module Stage-To-Stage Gap
209 Cell-To-Cell Gap
301 Outlet
401 Trigger Cell
701 Outlet
702 Mark
703 Mark
704 Mark
801 Outlet
802 Protrusion-Shaped Mark
805 Fixing Member
806 Release Direction

The invention claimed is:

1. A battery pack, comprising:
a plurality of cells, wherein:
each of the plurality of cells has a single outlet through which gas generated inside is released in one direction,
each of the plurality of cells has a sealing plate with a protrusion where the single outlet is located, and
two cells of the plurality of cells are arranged without a partition between the two cells such that the outlet of one of the two cells directly faces the outlet of another of the two cells such that directions of gas released through the respective outlets of the two cells are opposite to each other,
wherein the two cells are arranged and configured such that each outlet of one of the two cells directly faces an outlet of the other of the two cells.

2. The battery pack of claim 1, wherein
a mark indicating a direction of gas released through the outlet is placed on a case for each of the plurality of cells.

3. The battery pack of claim 1, wherein:
each of the plurality of cells includes a cylindrical case having an opening, and the sealing plate configured to seal the opening and having a central portion including the protrusion, and
only one outlet as the outlet is formed in a sidewall of the protrusion.

4. The battery pack of claim 3, wherein
the protrusion serves as an electrode terminal of the cell.

5. A battery pack, comprising:
a plurality of cells, wherein:
each of the plurality of cells has a single outlet through which gas generated inside is released in one direction,
each of the plurality of cells has a sealing plate with a protrusion where the single outlet is located, and
two cells of the plurality of cells are arranged along a longitudinal direction without a partition between the two cells whereby a top of one of the two cells directly faces a top of another of the two cells such that directions of gas released through the respective outlets of the two cells are opposite to each other,
wherein the two cells are arranged and configured such that each outlet of one of the two cells directly faces an outlet of the other of the two cells.

6. The battery pack of claim 5, wherein
a mark indicating a direction of gas released through the outlet is placed on a case for each of the plurality of cells.

7. The battery pack of claim 5, wherein:
each of the plurality of cells includes a cylindrical case having an opening, and the sealing plate configured to seal the opening and having a central portion including the protrusion, and
only one outlet as the outlet is formed in a sidewall of the protrusion.

8. The battery pack of claim 7, wherein
the protrusion serves as an electrode terminal of the cell.

* * * * *